(12) United States Patent
Azagarsamy et al.

(10) Patent No.: US 10,950,891 B2
(45) Date of Patent: Mar. 16, 2021

(54) DIESTER-BASED POLYMER ELECTROLYTES FOR HIGH VOLTAGE LITHIUM ION BATTERIES

(71) Applicant: Robert Bosch GmbH, Stuttgart (DE)

(72) Inventors: Malar Azagarsamy, Fremont, CA (US); Hany Basam Eitouni, Oakland, CA (US); Kulandaivelu Sivanandan, Fremont, CA (US)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 16/445,140

(22) Filed: Jun. 18, 2019

(65) Prior Publication Data

US 2019/0319307 A1    Oct. 17, 2019

Related U.S. Application Data

(63) Continuation of application No. 15/681,431, filed as application No. PCT/US2017/047709 on Aug. 21, 2017, now Pat. No. 10,367,228.

(Continued)

(51) Int. Cl.
| | |
|---|---|
| *H01M 10/0565* | (2010.01) |
| *C08G 63/00* | (2006.01) |
| *C08G 63/16* | (2006.01) |
| *C08G 63/685* | (2006.01) |
| *H01M 4/13* | (2010.01) |

(Continued)

(52) U.S. Cl.
CPC ........ *H01M 10/0565* (2013.01); *C08G 63/00* (2013.01); *C08G 63/16* (2013.01); *C08G 63/6856* (2013.01); *H01M 4/13* (2013.01); *H01M 10/056* (2013.01); *H01M 10/0525* (2013.01); *H01M 2300/0068* (2013.01); *H01M 2300/0082* (2013.01); *H01M 2300/0091* (2013.01)

(58) Field of Classification Search
CPC ............... H01M 10/0565; C08G 63/16; C08G 63/6856; C08G 63/00
See application file for complete search history.

(56) References Cited

U.S. PATENT DOCUMENTS

| | | |
|---|---|---|
| 5,275,750 A | 1/1994 | Sato et al. |
| 8,268,197 B2 | 9/2012 | Singh et al. |

(Continued)

FOREIGN PATENT DOCUMENTS

| | | |
|---|---|---|
| CN | 102924704 A | 2/2013 |
| EP | 1620884 B1 | 5/2008 |
| EP | 2657003 A1 | 10/2013 |

OTHER PUBLICATIONS

Singh et al., "Bridged Tetraquaternary Salts from N,N-polyfluoroalkyl-4,4-bipyridine", Inorganic Chemistry Article, Jul. 12, 2003, Idaho, 6 pages.

(Continued)

*Primary Examiner* — Stewart A Fraser
(74) *Attorney, Agent, or Firm* — Brooks Kushman P.C.

(57) ABSTRACT

New homopolymers and copolymers of diester-based polymers have been synthesized. When these polymers are combined with electrolyte salts, such polymer electrolytes have shown excellent electrochemical oxidation stability in lithium battery cells. Their stability along with their excellent ionic conductivities make them especially suitable as electrolytes in high energy density lithium battery cells.

22 Claims, 5 Drawing Sheets

Related U.S. Application Data

(60) Provisional application No. 62/545,984, filed on Aug. 15, 2017, provisional application No. 62/483,097, filed on Apr. 7, 2017.

(51) Int. Cl.
  *H01M 10/056* (2010.01)
  *H01M 10/0525* (2010.01)

(56) References Cited

U.S. PATENT DOCUMENTS

| | | |
|---|---|---|
| 8,563,168 B2 | 10/2013 | Balsara et al. |
| 8,889,301 B2 | 11/2014 | Balsara et al. |
| 9,054,372 B2 | 6/2015 | Singh et al. |
| 9,136,562 B2 | 9/2015 | Singh et al. |
| 9,893,337 B2 | 2/2018 | Pratt et al. |
| 2002/0102464 A1 | 8/2002 | Yoshida et al. |
| 2003/0031932 A1 | 2/2003 | Okumura et al. |
| 2004/0130061 A1 | 7/2004 | Lavoie et al. |
| 2005/0054804 A1* | 3/2005 | Dams .......... C08G 65/336 528/44 |
| 2007/0287822 A1 | 12/2007 | Pearson et al. |
| 2010/0105794 A1 | 4/2010 | Dietliker et al. |
| 2012/0321966 A1 | 12/2012 | Wallin et al. |
| 2013/0084459 A1* | 4/2013 | Larson .......... C09D 133/16 428/422 |
| 2013/0149616 A1 | 6/2013 | Lee et al. |
| 2013/0189592 A1 | 7/2013 | Roumi et al. |
| 2017/0187063 A1 | 6/2017 | Pistorino et al. |
| 2018/0248225 A1* | 8/2018 | Cheng .......... H01M 10/052 |
| 2018/0316043 A1 | 11/2018 | Jung et al. |

OTHER PUBLICATIONS

Zhang et al., "Direct methylation and trifluoroethylation of imidazole and pyridine derivatives", ChemComm, Aug. 5, 2003, South Carolina, 2 pages.

Bonhote et al., "Hydrophoic, Highly Conductive Ambient-Temperature Molten Salts", Inorganic Chemistry Article, Aug. 15, 1995, Switzerland, 11 pages.

Madria et al., "Ionic liquid electrolytes for lithium batteries: Synthesis, electrochemical, and cytotoxicity studies", Journal of Power Sources, Feb. 9, 2013, Missouri, 8 pages.

Xue et al., "Ionic Liquids with Fluorine-Containing Cations", Microreview, Apr. 27, 2005, Idaho, 8 pages.

Singh et al., "New dense fluoroalkyl-substituted imidazolium ionic liquids", Tetrahedron Letters, Oct. 30, 2002, Idaho, 3 pages.

Singh et al., "Syntheses of the first N-mono- and N,N-dipolyfluoroalkyl-4,4-bipyridinium compounds", ChemComm, Idaho, May 9, 2003, 2 pages.

Del Sesto et al., "Tetraalkylphosphonium-based ionic liquids", Journal of Organometallic Chemistry, Oct. 28, 2004, Colorado, 7 pages.

Garcia, "Polyoxalates from biorenewable diols via Oxalate Metathesis Polymerization," Polymer Chemistry, Iss. 3, 2014 [retrieved on Nov. 15, 2017]. Retrieved from the Internet: pp. S1-S4, 2-17. 20-22 supplementary information.

International Search Report for PCT/US2017/047709 from USPTO Search Authority.

Lee, "Ionic conductivity in the poly(ethylene malonate) / lithium triflate system," Solid State Ionics 138 (2001) 273-276.

* cited by examiner

DIESTER-BASED POLYMER ELECTROLYTES FOR HIGH VOLTAGE LITHIUM ION BATTERIES

CROSS-REFERENCE TO RELATED APPLICATIONS

This application is a Continuation of U.S. patent application Ser. No. 15/681,431, filed Aug. 21, 2017, now U.S. Pat. No. 10,367,228, issued Jul. 30, 2019, which is a Continuation of International Application PCT/US17/47709, filed Aug. 21, 2017, which, in turn, claims priority to U.S. Provisional Patent Application 62/483,097, filed Apr. 7, 2017, and to U.S. Provisional Patent Application 62/545,984, filed Aug. 15, 2017, all of which are incorporated by reference herein.

BACKGROUND OF THE INVENTION

Field of the Invention

This invention relates generally to electrolytes for lithium batteries, and, more specifically, to electrolytes that are especially suited for use in cathodes and at high voltages.

More and more lithium battery manufacturers are using next-generation cathode materials such as NCA (lithium nickel cobalt aluminum oxide), NCM (lithium nickel cobalt manganese oxide), and high energy NCM (HE-NCM-magnesium-rich lithium nickel cobalt manganese oxide) in order to exploit their potentially high gravimetric energy densities (as high as 300-500 Wh/kg), their good rate capabilities and their long-term stability. Cells made with such oxidatively stable materials often operate at higher voltages (e.g., as high as 4.7V) than do cells (e.g., 3.6-3.8V) with olivine cathode materials such as LFP (lithium iron phosphate). Electrolytes that have been stable at the lower voltages of LFP cells may have difficulty operating at the higher voltages, especially in the cathode. Degradation, in the form of oxidation, may lead to capacity fade early in the life of a cell.

Thus, there is a need to develop electrolytes that are especially well-suited to operate in the high voltage conditions of next generation cathode materials.

SUMMARY

In one embodiment of the invention, new polymers are disclosed. The polymers are diester-based polymers and have a structure selected from the group consisting of:

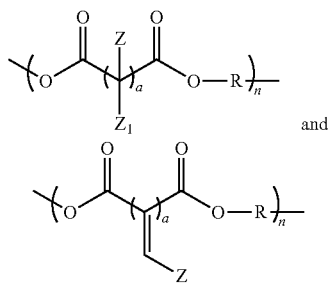

and wherein:
each Z and $Z_1$ is selected independently from the group consisting of:

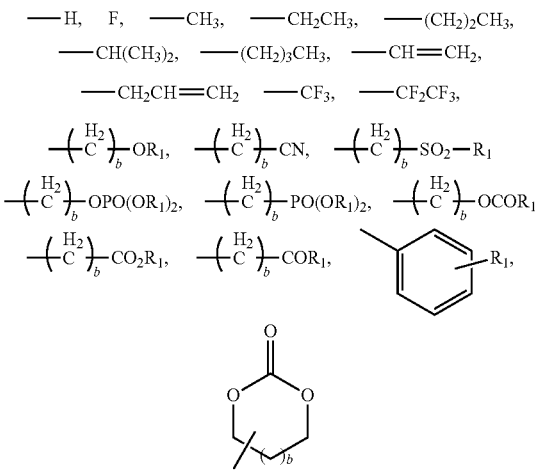

each $R_1$ is selected independently from the group consisting of H, $CH_3$, $CH_2CH_3$, $(CH_2)_2CH_3$, $CH(CH_3)_2$, $CH=CH_2$, and $CH_2CH=CH_2$; and each R is selected independently from the group consisting of:

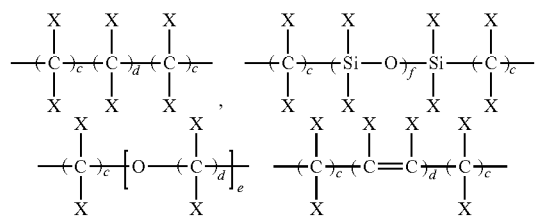

wherein each X is selected independently from the group consisting of H, F, $CH_3$, $CH_2CH_3$, $(CH_2)_2CH_3$, and $CF_3$;

a, b, and f are each integers that range independently from 0 to 10;

c, d, and e are each integers that range independently from 1 to 10; and n is an integer that ranges from 1 to 1000.

In one embodiment of the invention, any of the diester-based polymers disclosed herein can be combined with an electrolyte salt, such as a lithium salt, and be used as an electrolyte.

In one embodiment of the invention the diester-based polymer electrolyte also contains ceramic electrolyte particles.

In another embodiment of the invention, the diester-based polymer is copolymerized with a carbonate to form a random copolymer. The random copolymer may also contain an electrolyte salt and be used as an electrolyte.

In another embodiment of the invention, the diester-based polymer is crosslinked. The crosslinked polymer may also contain an electrolyte salt and be used as an electrolyte.

In another embodiment of the invention, a positive electrode contains a positive electrode active material mixed together with a catholyte that contains any of the diester-based polymer electrolytes described here. In one arrangement, the catholyte contains a mixture of any of the diester-based polymer electrolytes described here and another electrolyte, such as a solid polymer electrolyte. In some arrangements, the first catholyte also contains ceramic electrolyte particles. In some arrangements, the first catholyte is crosslinked. The positive electrode active material may be any of lithium iron phosphate, lithium metal phosphate divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, or combinations thereof. The catholyte salt may be a lithium salt.

In another embodiment of the invention, an electrochemical cell has an anode configured to absorb and release lithium ions; a cathode comprising cathode active material particles, an electronically-conductive additive, and a first catholyte; a current collector adjacent to an outside surface of the cathode; and a separator region between the anode and the cathode. The first catholyte may be any of the diester-based polymer electrolytes disclosed herein, and the electrolyte salt may be a lithium salt. In one arrangement, the catholyte contains a mixture of any of the diester-based polymer electrolytes described here and another electrolyte, such as a solid polymer electrolyte. In some arrangements, the first catholyte also contains ceramic electrolyte particles. In some arrangements, the first catholyte is crosslinked. In one arrangement, the first catholyte and the separator electrolyte are the same. The separator electrolyte may contain a solid polymer electrolyte.

In another arrangement, the electrochemical cell also has an overlayer between the cathode and the separator region, and the overlayer contains a second catholyte. The second catholyte may also contain any of the diester-based polymer electrolytes disclosed herein and may be the same or different from the first catholyte.

The anode may contain a material such as lithium metal, lithium alloy, lithium titanate, graphite and silicon. The cathode active material particles may contain any of lithium iron phosphate, lithium metal phosphate divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, or combinations thereof. In one arrangement, the cathode also contains a binder material such as polyvinylidene difluoride, poly(vinylidene fluoride-co-hexafluoropropylene), polyacrylonitrile, polyacrylic acid, polyethylene oxide, carboxymethyl cellulose, styrene-butadiene rubber, or combinations thereof.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
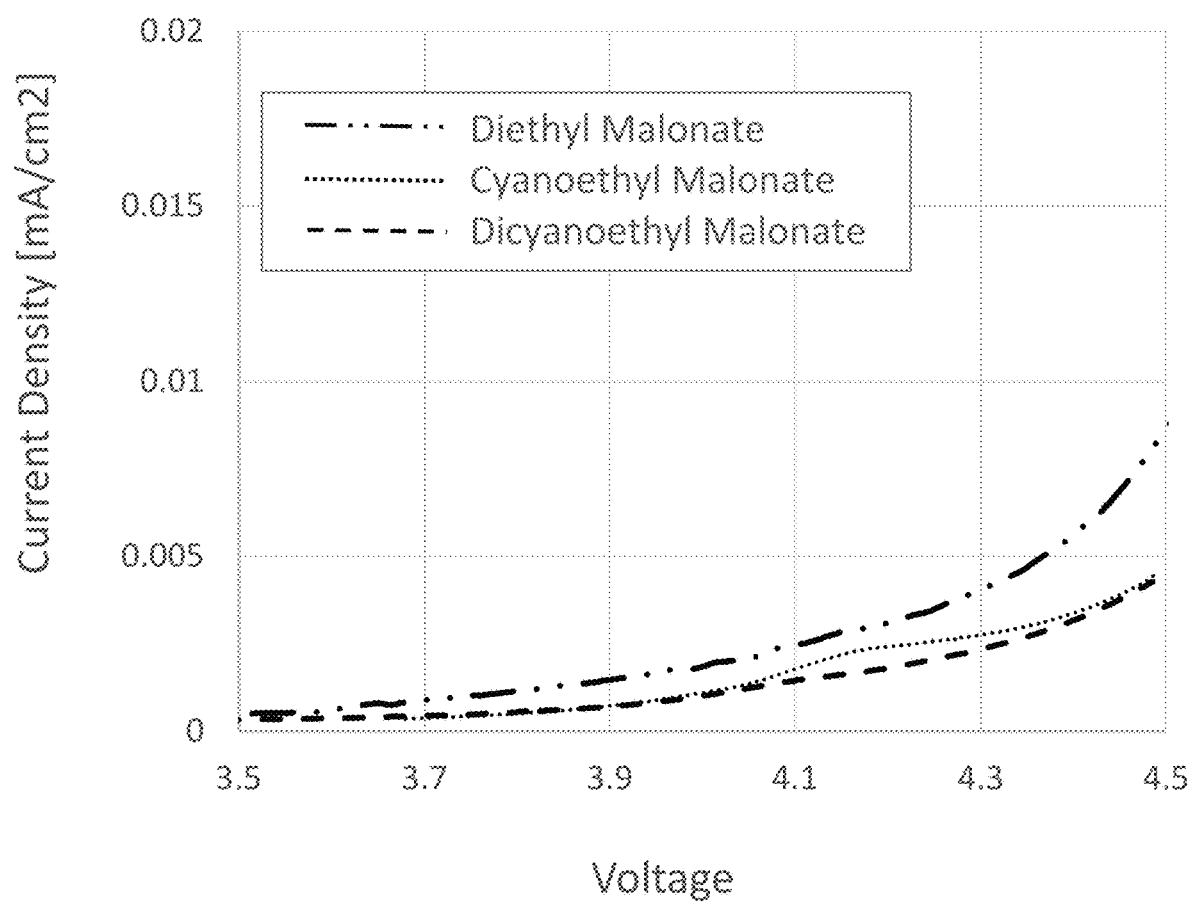
FIG. 1 is a graph that shows cyclic voltammetry data for some diester-based small molecules, according to an embodiment of the invention.

The preferred embodiments are illustrated in the context of diester-based polymers that can be used as electrolytes or electrolyte additives in lithium battery cells and the like. The skilled artisan will readily appreciate, however, that the materials and methods disclosed herein will have application in a number of other contexts where high-voltage electrolytes are desirable, particularly where long-term stability is important.

These and other objects and advantages of the present invention will become more fully apparent from the following description taken in conjunction with the accompanying drawings.

All publications referred to herein are incorporated by reference in their entirety for all purposes as if fully set forth herein.

In this disclosure, the terms "negative electrode" and "anode" are both used to describe a negative electrode. Likewise, the terms "positive electrode" and "cathode" are both used to describe a positive electrode.

It is to be understood that the terms "lithium metal" or "lithium foil," as used herein with respect to negative electrodes, describe both pure lithium metal and lithium-rich metal alloys as are known in the art. Examples of lithium rich metal alloys suitable for use as anodes include Li—Al, Li—Si, Li—Sn, Li—Hg, Li—Zn, Li—Pb, Li—C or any other Li-metal alloy suitable for use in lithium metal batteries. Other negative electrode materials that can be used in the embodiments of the invention include materials in which lithium can intercalate, such as graphite, and other materials that can absorb and release lithium ions, such as silicon, germanium, tin, and alloys thereof. Many embodiments described herein are directed to batteries with solid polymer electrolytes, which serve the functions of both electrolyte and separator. As it is well known in the art, batteries with liquid electrolytes use an inactive separator material that is distinct from the liquid electrolyte.

The following construction is used throughout this disclosure: "each variable is chosen independently" from a list that is provided. An example of this usage can be found with reference to X groups in some of the inventive polymer structures in which there are many X's. The example is, "each X may be chosen independently from hydrogen, fluorine, methyl, ethyl, isopropyl, and trifluoromethyl groups." This construction is used to mean that for a particular X in the structure, any of the groups in the list may be used. In choosing a group to use for another X in the structure, any of the groups in the list may be used with no regard to the choices that have been made for other X groups. Thus, the following arrangements are all possible: all the X's may be the same, all the X's may be different, or some X's may be the same and some may be different.

The molecular weights given herein are number-averaged molecular weights.

In this disclosure, ranges of values are given for many variables. It should be understood that the possible values for any variable also include any range subsumed within the given range.

In one embodiment of the invention, homopolymers and copolymers of diester-based polymers are disclosed as new polymer electrolytes for lithium ion battery cells. The excellent electrochemical oxidation stability and substantial ionic conductivities of such diester-based polymers make them highly suitable for use in high energy density lithium battery cells.

Most of the existing polymers lack functional side chains. Incorporation of polar and nonpolar functionalities as pendant side chains can significantly change their physical and chemical properties. In the embodiments of the invention, as disclosed herein, some homopolymer and or copolymer type diester-based polymers have functional side chains and some do not.

In one embodiment of the invention, diester-based polymers combined with electrolyte salts are polymer electrolytes that can function at voltages of 4.2V or more. Small molecules and polymers with functional groups such as esters and/or nitriles can be especially useful in high energy density lithium battery cells not only because they can bind with lithium ions but also because of their electrochemical oxidation stability at voltages of 4.2V or more. While there are a wide variety of nitrile (cyano)-based small molecule electrolytes, such as adiponitriles and succinonitriles, that are in use or under exploration as electrolytes, only a handful of nitrile-based polymers have been explored as polymer electrolytes for lithium battery cells. Diester-based polymers may be especially useful as electrolytes in lithium battery cells because their two carbonyl groups have high electron density which may provide additional lithium binding properties to the polymeric system. In addition, such diester-based polymers are easy to synthesize.

In one embodiment of the invention, two general structures for diester-based polymers are shown below. Structure A is a diester-based polymer that has functional side chains $Z$ and $Z_1$ that can be attached either directly as shown or through extendable alkyl chains (not shown). Structure B is a diester-based polymer that has a functional side chain $Z$ that is in conjugation between two esters. The number of repeat structures for the polymers is indicated by the integer n. In one arrangement, n ranges from 1 to 1000.

Structure A

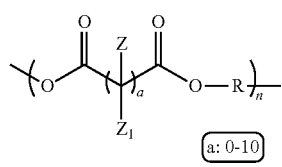

Structure B

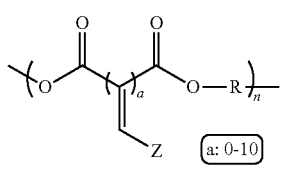

Each $Z$, $Z_1$, and $R$ is chosen independently from the lists below, a is an integer that ranges from 0 to 10, and n is an integer that ranges from 1 to 1000.

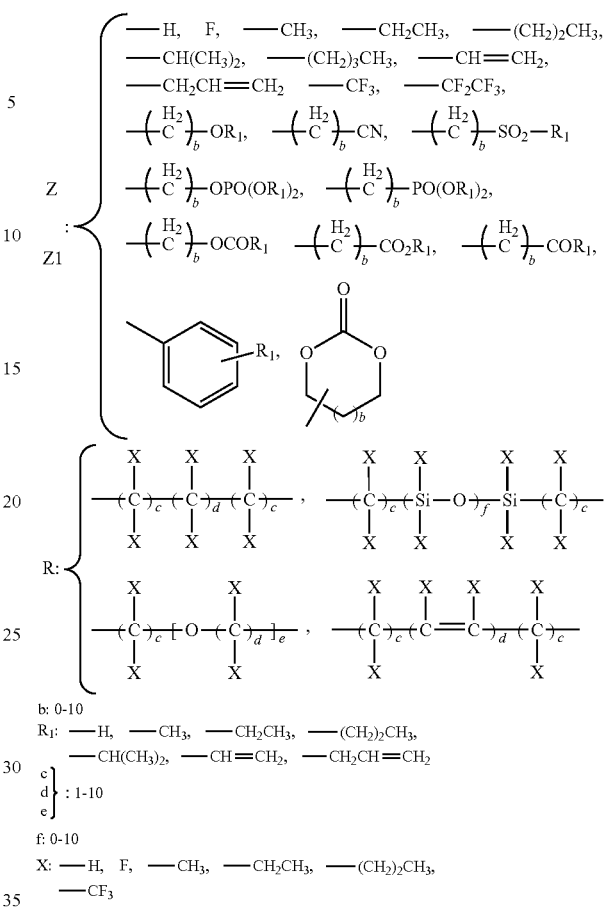

In the Z groups: b is an integer that ranges from 0 to 10; and each $R_1$ may be chosen independently from hydrogen, methyl, ethyl, propyl, isopropyl, allyl, or vinyl. In the R groups; c, d, and e are each integers that range independently from 1 to 10; f is an integer that ranges independently from 0 to 10; and each X may be chosen independently from hydrogen, fluorine, methyl, ethyl, isopropyl, and trifluoromethyl groups.

Various diester-based polymers may have more specific names depending on the value of a in the formulas above. For examples, diester-based polymers for which a is zero, are called oxalates, for which a is one are called malonates, for which a is two are called succinates, for which a is three are called glutarates and for which a is four are called adipates.

In another embodiment of the invention, Structure A and Structure B include crosslinkable Z groups and/or R groups, which make it possible for such diester-based polymers to be crosslinked. Examples of such crosslinkable Z groups include, but are not limited to, vinyl and allyl groups. Examples of such crosslinkable R groups include, but are not limited to, unsaturated polyolefins such as polybutadiene and polyisoprene. When Structure A or Structure B includes one or more such crosslinkable group(s), it is possible to crosslink the structures using a number of approaches including thermal or UV generation of radicals, click chemistries, hydrosilylation, transesterification, or any other commonly used crosslinking strategy.

In another embodiment of the invention, particles of ceramic electrolyte are mixed into a diester-based polymer electrolyte to form an enhanced composite electrolyte with superior ionic transport and mechanical properties. Such a composite electrolyte may be used in a lithium battery cell in the cathode. Examples of ceramic electrolytes that are useful for mixing with diester-based polymer electrolytes include, but are not limited to, those shown in Table 1 below.

malonate-based polymer (i.e., with a cyano ethyl as a functional side chain), a diethyl bis(2-ethylcyano) malonate (3) that structurally resembles a difunctionalized malonate-based polymer (i.e., with two cyano ethyl functional side chains), a diethyl oxalate (4) that structurally resembles oxalate-based polymers and a dimethyl succinate (5) that structurally resembles succinate-based polymers. It is

TABLE 1

Exemplary Ceramic Conductors for Use as Additives in Diester-Based Polymer Electrolytes

| Electrolyte Type | Exemplary Formulas | Mixture Proportion |
|---|---|---|
| Oxynitride glass | $Li_xPO_yN_z$ x = 2.9, y = 3.3, z = 0.46 0.24 < z < 1.2 | |
| | $Li_xBO_yN_z$ | |
| Sulfide and oxysulfide glass | $Li_2S \cdot P_2S_5$ | 0.75:0.25 |
| | $Li_2S \cdot SiS_2$ | 0.6:0.4 |
| | $Li_2S \cdot SiS_2 \cdot Li_xMO_4$ M = Si, P, Ge | 0.57:0.38:0.05 |
| | $Li_2S \cdot SiS_2 \cdot Li_3PO_4$ | 0.63:0.36:0.01 |
| | $Li_2S \cdot SiS_2 \cdot xMS_y$ M = Sn, Ta, Ti | 0.6:0.4:0.01-0.05 |
| | $Li_2S \cdot SiS_2 \cdot Li_3N$ | 0.55:0.40:0.03 |
| $Li_{thi}on_{in}$ide glass | $Li_3N \cdot SiS_2$ | 0.4:0.6 |
| LLTO Perovskite structure (Ohara type) | $La_{2/3-x}Li_{3x}TiO_3$ 0.03 ≤ x ≤ 0.167 | |
| | $La_{1/3-x}Li_{3x}TaO_3$ 0.025 ≤ x ≤ 0.167 | |
| | $La_{1/3-x}Li_{3x}NbO_3$ 0 ≤ x ≤ 0.06 | |
| Nasicon-type (Lisicon) phosphate | $Li_{1.3}Ti_{1.7}Al_{0.3}(PO_4)_3$ | |
| | $LiAlTa(PO_4)_3$ | |
| | $LiAl_{0.4}Ge_{1.6}(PO_4)_3$ | |
| | $Li_{1.4}Ti_{1.6}Y_{0.4}(PO_4)_3$ | |
| | $Li_{3-2x}(Sc_{1-x}M_x)_2(PO_4)_3$ M = Zr, Ti, x = 0.1, 0.2 | |
| | $Li_3Sc_{1.5}Fe_{0.5}(PO_4)_3$ | |

• denotes that components are mixed together

In another embodiment of the invention, any of the diester-based polymer electrolytes disclosed herein are copolymerized with a carbonate to form a random copolymer. The basic structures of such copolymers made with Structure A and Structure B are shown below:

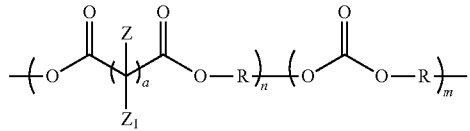

Copolymer made with Structure A

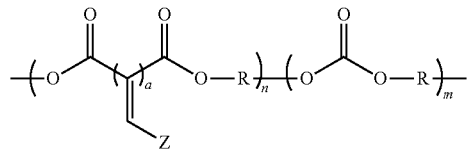

Copolymer made with Structure B

Each Z, $Z_1$, and R is chosen independently from the lists shown above for the diester-based polymers, a is an integer that ranges from 0 to 10, n is an integer that ranges from 1 to 1000, and m is an integer that ranges from 1 to 1000.

Voltage Stability:

In one embodiment of the invention, voltage stabilities for various diethyl diester-based small molecules were measured using cyclic voltammetry. The diester-based small molecules that were measured include: a diethyl malonate (1) that structurally resembles a non-functionalized malonate-based polymer, a diethyl 2-ethylcyano malonate (2) that structurally resembles a mono-functionalized expected that the voltage stability behavior of these model small molecules will be reflected in the voltage stability behavior of

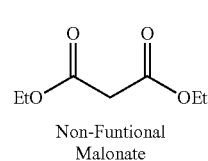

Non-Funtional Malonate

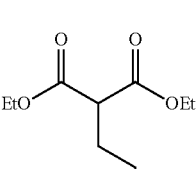

Mono functional Cyanoethyl Malonate

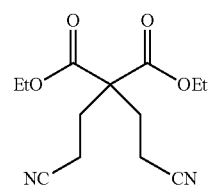

Di functional Bis(Cyanoethyl) Malonate

-continued

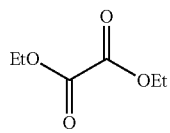

Diethyl Oxalate

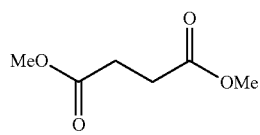

Dimethyl Succinate corresponding polymers made from these small molecules.

Figure 2:
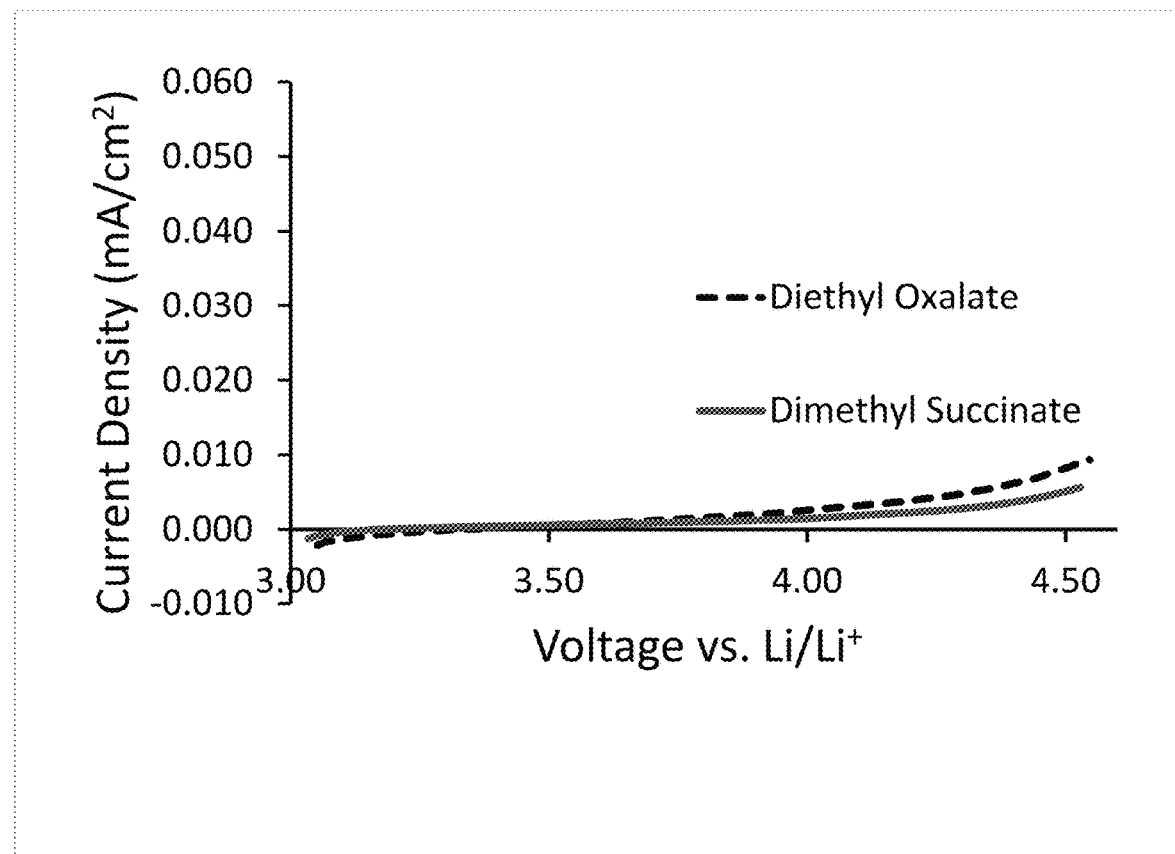
FIG. 2 is a graph that shows cyclic voltammetry data for some other diester-based small molecules, according to an embodiment of the invention.

Cyclic voltammetry was measured using a three-electrode system that included a Pt button working electrode, a Pt wire counter electrode, and a quasi-reference electrode constructed from an Ag wire dipped in a 10 mM $AgNO_3$ in 0.1M tetrabutylammonium hexafluorophosphate solution in a glass tubing with an attached Vycor frit. The quasi-reference electrode was first calibrated against a 10 mM ferrocene solution in 0.1M lithium tetrafluoroborate ($LiBF_4$) in propylene carbonate, to give $E_{ox}$ (ferrocene/ferrocenium)= 0.058 V vs. $Ag/Ag^+$). Then the same ferrocene solution was used to calibrate a lithium reference electrode ($E_{ox}$ (ferrocene/ferrocenium)=3.35–3.39 V vs. $Li/Li^+$). The cyclic voltammetry was carried out on 10 wt % solutions of compounds 1-5, each in 0.1M $LiBF_4$ in propylene carbonate and at a scan rate of 5 mV/s. The results are shown in FIGS. 1 and 2. The cyclic voltammetry data were then standardized for $Li/Li^+$ to reflect oxidation stability in a lithium cell, as electrolyte materials made from compounds 1-5 can interact with electrodes in an actual battery cell. As shown in FIG. 1 (compounds 1, 2 and 3) and in FIG. 2 (compounds 4 and 5), all compounds had electrochemical oxidation stability up to at least 4.5 V with insignificant current density response even at 4.5 V. This clearly indicates that these types of diester-based polymer structural systems, either with or without pendant cyano/nitrile functionalities, are stable and can be used as electrolytes in high energy density lithium ion batteries.

Conductivity:

The ionic conductivities of electrolytes made from some exemplary diester-based polymers and LiTFSI lithium salt were measured using impedance spectroscopy. The results are shown in Table 2. Symmetric cells were built by sandwiching the diester-based polymer electrolytes between two aluminum electrodes. The electrolytes had various concentrations of LiTFSI, as shown in Table 2. Conductivities were measured at 80° C. Poly(1,7-heptylmalonate) (Sample No. 1) showed excellent ionic conductivity as compared to cyano functionalized diester-based polymers. Among the cyano-functionalized polymers, mono-cyano functionalized diester-based polymers (Sample Nos. 2, 3, 4 and 5) showed significantly better conductivity than their di-cyano counterparts (Sample Nos. 6 and 7, respectively). Oxalate-based polymers (Sample Nos. 8 and 9) and succinate-based polymers (Sample No. 10) showed comparable conductivities. The data clearly show that these diester-based polymers all have substantial lithium ion conductivities at 80° C.

TABLE 2

| | | | \multicolumn{4}{c}{Ionic Conductivities of Diester-Based Polymers} |
|---|---|---|---|---|---|---|
| | | | \multicolumn{4}{c}{LiTFSI concentration (wt %) and Conductivity at 80° C. ($10^{-4}$ S/cm)} |
| Sample No. | Material | Chemical Structure | 10 wt % | 20 wt % | 30 wt % | 40 wt % |
| 1 | Poly (1,7-heptyl malonate) | | — | 2.3 | 1.9 | 1.1 |
| 2 | Poly (1,7-heptyl 2-cyanoethyl malonate) | | 0.7 | 0.98 | 1.1 | — |
| 3 | Poly (1,6-hexyl 2-cyanoethyl malonate) | | 0.53 | 0.88 | 0.76 | 0.66 |

TABLE 2-continued

Ionic Conductivities of Diester-Based Polymers

| Sample No. | Material | Chemical Structure | LiTFSI concentration (wt %) and Conductivity at 80° C. ($10^{-4}$ S/cm) | | | |
|---|---|---|---|---|---|---|
| | | | 10 wt % | 20 wt % | 30 wt % | 40 wt % |
| 4 | Poly (1,5-pentyl 2-cyanoethyl malonate) | | 0.48 | 0.89 | 0.95 | — |
| 5 | Poly (3-methyl pentyl bis(2-cyanoethyl) malonate) | | 0.28 | 0.38 | 0.5 | — |
| 6 | Poly (1,5-pentyl bis(2-cyanoethyl) malonate) | | 0.14 | 0.33 | 0.25 | 0.28 |
| 7 | Poly (1,5-pentyl bis(2-cyanoethyl) malonate) | | 0.19 | 0.27 | 0.3 | — |
| 8 | Poly (1,5-pentyl oxalate) | | — | 2.1 | 2.8 | 2.4 |
| 9 | Poly (1,7-heptyl oxalate) | | — | 1.7 | 1.0 | 1.8 |
| 10 | Poly (1,5-pentyl succinate) | | — | 1.9 | 2.1 | 1.4 |
| 11 | Poly (1,4-cis-butenyl malonate) | | — | 2.8 | 1.9 | 1.1 |

Cell Designs that Include Diester-Based Polymers

Figure 3:
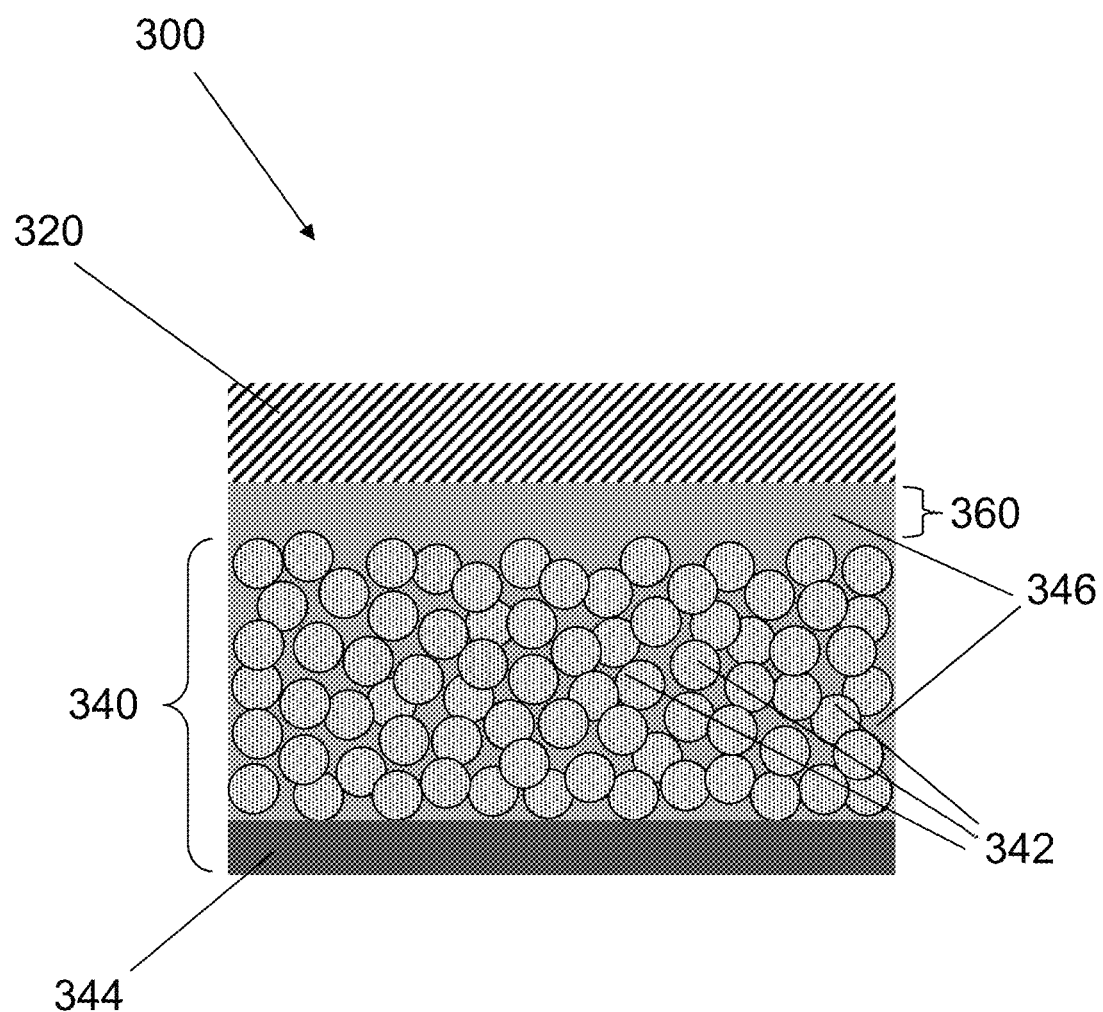
FIG. 3 is a schematic illustration of one configuration of a lithium battery cell that contains an electrolyte that is used in both the cathode and the separator, according to an embodiment of the invention.

In one embodiment of the invention, a lithium battery cell 300 has an anode 320 that is configured to absorb and release lithium ions, as shown in FIG. 3. The anode 320 may be a lithium or lithium alloy foil or it may be made of a material into which lithium ions can be absorbed such as graphite or silicon. Other choices for the anode 320 include, but are not limited to, lithium titanate, and lithium-silicon alloys. The lithium battery cell 300 also has a cathode 340 that includes cathode active material particles 342, an electronically-conductive additive such as carbon black (not shown), a current collector 344, a catholyte (electrolyte in the cathode)

346, and an optional binder (not shown). In one arrangement, the catholyte 346 includes any of the diester-based polymer electrolytes disclosed above. In another arrangement, the catholyte 346 includes mixtures or combinations of other solid polymer electrolytes with diester-based polymer electrolytes. There is a separator region 360 between the anode 320 and the cathode 340. The catholyte 346 extends all the way into the separator region 360 and facilitates movement of lithium ions back and forth between the anode 320 and the cathode 340 as the cell 300 cycles. The electrolyte 346 in the separator region 360 and the catholyte 346 in the cathode 340 are the same.

Figure 4:
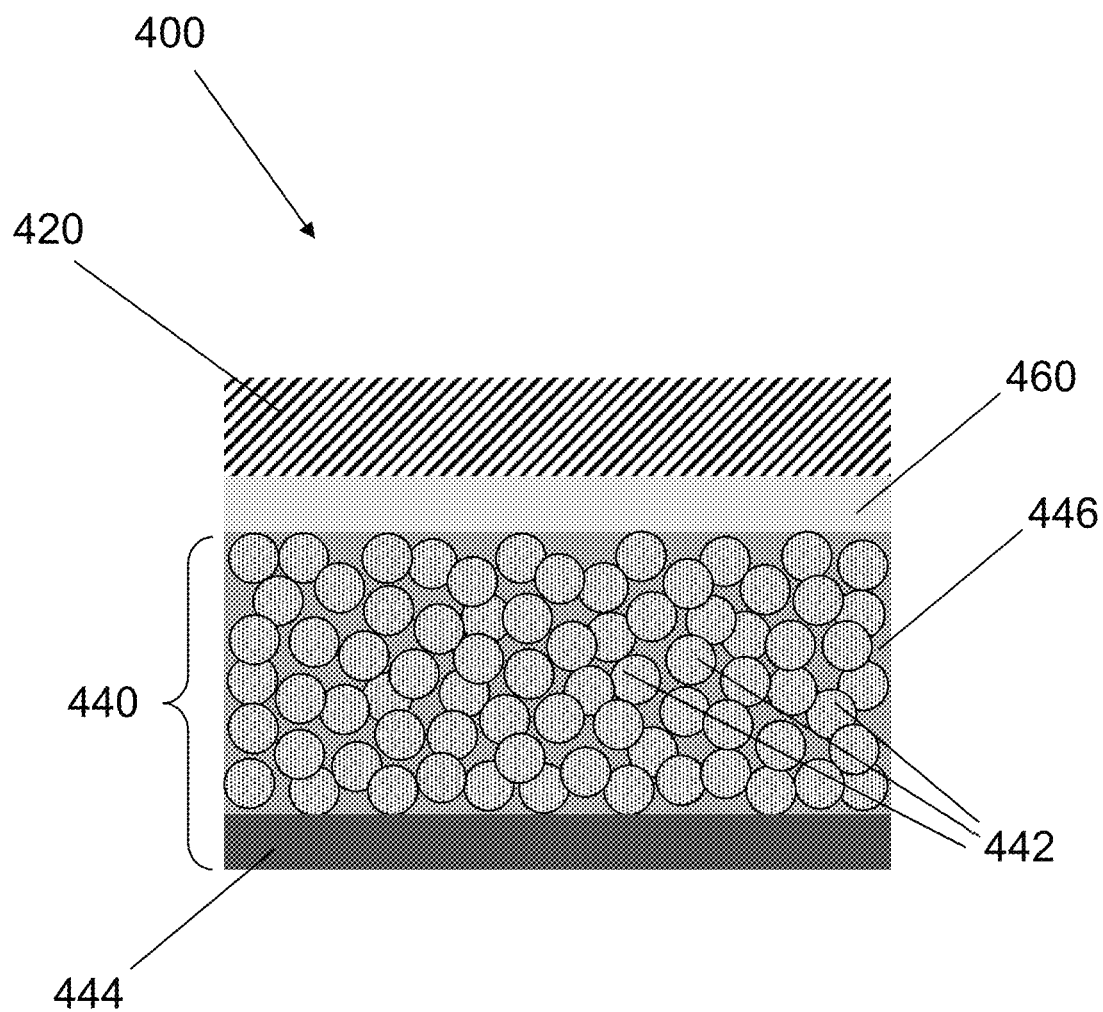
FIG. 4 is a schematic illustration of another configuration of a lithium battery cell that contains a catholyte and a separator electrolyte different from the catholyte, according to an embodiment of the invention.

In another embodiment of the invention, a lithium battery cell 400 has an anode 420 that is configured to absorb and release lithium ions as shown in FIG. 4. The anode 420 may be a lithium or lithium alloy foil or it may be made of a material into which lithium ions can be absorbed such as graphite or silicon. Other choices for the anode 420 include, but are not limited to, lithium titanate, and lithium-silicon alloys. The lithium battery cell 400 also has a cathode 440 that includes cathode active material particles 442, an electronically-conductive additive such as carbon black (not shown), a current collector 444, a catholyte 446, and an optional binder (not shown). In one arrangement, the catholyte 446 includes any of the diester-based polymer electrolytes disclosed above. In another arrangement, the catholyte 446 includes mixtures or combinations of other solid polymer electrolytes with diester-based polymer electrolytes. There is a separator electrolyte 460 between the anode 420 and the cathode 440. The separator electrolyte 460 facilitates movement of lithium ions back and forth between the anode 420 and the cathode 440 as the cell 400 cycles. The separator electrolyte 460 may include any electrolyte that is suitable for use in a lithium battery cell. In one arrangement, the separator electrolyte 460 contains a liquid electrolyte that is soaked into a porous plastic material (not shown). In another arrangement, the separator electrolyte 460 contains a viscous liquid or gel electrolyte. In another arrangement, the separator region 460 contains a solid polymer electrolyte in which the diester-based polymer is immiscible.

Figure 5:
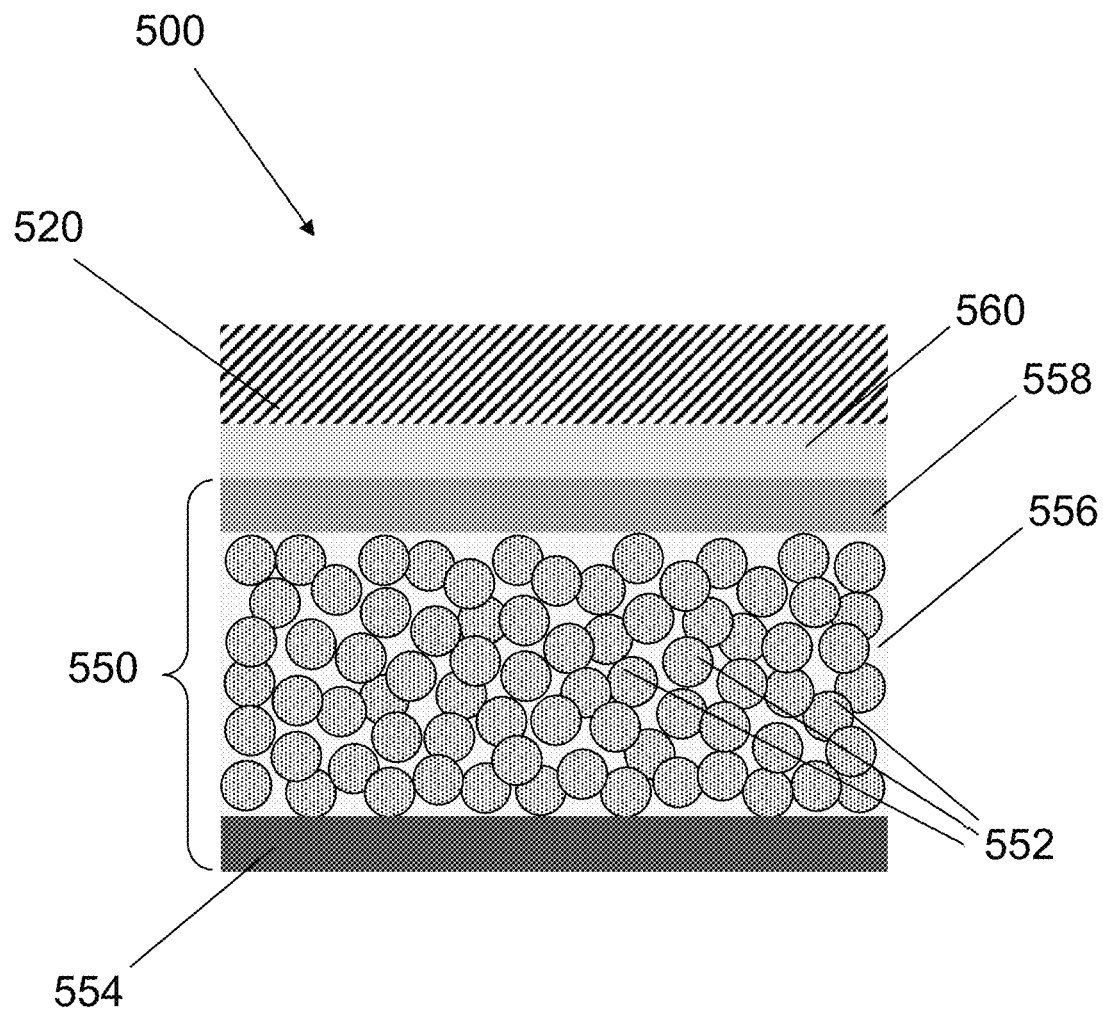
FIG. 5 is a schematic illustration of another configuration of a lithium battery cell that contains a catholyte and a cathode overlayer, according to an embodiment of the invention.

In another embodiment of the invention, a battery cell with a third configuration is described. With reference to FIG. 5, a lithium battery cell 500 has an anode 520 that is configured to absorb and release lithium ions. The anode 520 may be a lithium or lithium alloy foil or it may be made of a material into which lithium ions can be absorbed such as graphite or silicon. Other choices for the anode 520 include, but are not limited to, lithium titanate, and lithium-silicon alloys. The lithium battery cell 500 also has a cathode 550 that includes cathode active material particles 552, an electronically-conductive additive (not shown), a current collector 554, a catholyte 556, an optional binder (not shown), and an overcoat layer 558. In one arrangement, the electrolyte in the overcoat layer 558 and the catholyte 556 are the same. In another arrangement, the electrolyte in the overcoat layer 558 and the catholyte 556 are different. The overcoat layer 558 and/or the catholyte 556 may contain any of the diester-based polymer electrolytes or mixtures or combinations of other solid polymer electrolytes with diester-based polymer electrolytes or electrolyte additives (in a solid polymer electrolyte host) disclosed herein. In one arrangement, the overcoat layer 558 is a solid electrolyte layer. There is a separator region 560 between the anode 520 and the cathode 550. The separator region 560 contains an electrolyte that facilitates movement of lithium ions back and forth between the anode 520 and the cathode 550 as the cell 500 cycles. The separator region may include any electrolyte that is suitable for such use in a lithium battery cell. In one arrangement, the separator electrolyte 560 contains a liquid electrolyte that is soaked into a porous plastic material (not shown). In another arrangement, the separator electrolyte 560 contains a viscous liquid or gel electrolyte. In another arrangement, the separator region 560 contains a solid polymer electrolyte in which the diester-based polymer is immiscible.

A solid polymer electrolyte for use in separator region, such as separator regions 460 or 560, can be any electrolyte that is appropriate for use in a Li battery. Of course, many such electrolytes also include electrolyte salt(s) that help to provide ionic conductivity. Examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. In one arrangement, the ionically-conductive phase contains one or more diester-based polymer, as disclosed herein. The linear polymers can also be used in combination as graft copolymers with polysiloxanes, polyalkoxysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state.

With respect to the embodiments described in FIGS. 3, 4, and 5, suitable cathode active materials include, but are not limited to, LFP (lithium iron phosphate), LMP (lithium metal phosphate in which the metal can be Mn, Co, or Ni), $V_2O_5$ (divanadium pentoxide), NCA (lithium nickel cobalt aluminum oxide), NCM (lithium nickel cobalt manganese oxide), high energy NCM (HE-NCM—magnesium-rich lithium nickel cobalt manganese oxide), lithium manganese spinel, lithium nickel manganese spinel, and combinations thereof. Suitable electronically-conductive additives include, but are not limited to, carbon black, graphite, vapor-grown carbon fiber, graphene, carbon nanotubes, and combinations thereof. A binder can be used to hold together the cathode active material particles and the electronically conductive additive. Suitable binders include, but are not limited to, PVDF (polyvinylidene difluoride), PVDF-HFP poly (vinylidene fluoride-co-hexafluoropropylene), PAN (polyacrylonitrile), PAA (polyacrylic acid), PEO (polyethylene oxide), CMC (carboxymethyl cellulose), and SBR (styrene-butadiene rubber).

EXAMPLES

The following examples provide details relating to synthesis of diester-based polymers in accordance with the present invention. It should be understood the following is representative only, and that the invention is not limited by the detail set forth in these examples.

General Synthesis of Diester-Based Polymers

In one embodiment of the invention, the diester-based polymers described herein may be synthesized using polycondensation of a diester (e.g., malonate, succinate) (in which $R_2$ is either methyl or ethyl) and a diol as shown below. The resultant polymers can be: (i) homopolymers, where only one type of diester and only one diol type are used, or (ii) copolymers, where, one or more than one type of diesters are condensed with one or more than one type of diol.

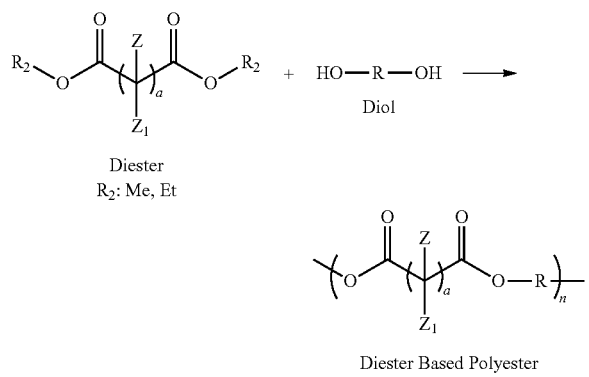

Diester
$R_2$: Me, Et

Diester Based Polyester

As shown above, a polycondensation catalyst (1 mol %), such as titanium isopropoxide or 1, 5, 7 triazabicyclo[4.4.0]dec-5-ene (TBD), was added to a mixed solution of diester (1 equiv.) and a diol (1 equiv.) in tetrahydrofuran (THF) in an argon atmosphere at room temperature, and was then stirred for 2 hours at 120° C. While maintaining the same temperature, the reaction flask was exposed to high vacuum intermittently for 5 hours to remove emerging ethanol and/or methanol byproducts from the reaction mixture. Again, at the same temperature, the partially polymerized mixture in the reaction flask was exposed to constant high vacuum for 20 hours. The viscous polymerized mixture was then dissolved in dichloromethane (DCM) and then added dropwise into methanol. The resultant polymer precipitate was dissolved in DCM again and then re-precipitated to produce diester-based polymer that was free from monomers and catalyst. The amount of catalyst can be adjusted to determine the reaction time and the molecular weight of the resultant polymers. The polymers synthesized in the following examples had molecular weights in the range of 1000 Daltons to 100,000 Daltons depending on their reaction times and catalyst loadings. As it is well known in the art, condensation polymerizations can produce high molecular weight polymers when high concentrations of catalyst are used, when the elimination product is removed, and when reaction time and temperature are optimized.

Poly (1,7-heptylmalonate)

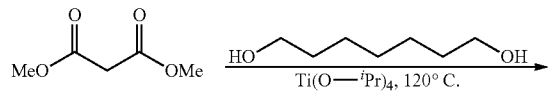

-continued

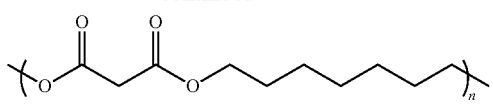

In an exemplary embodiment, poly (1,7-heptylmalonate) was synthesized as follows. A solution of titanium(IV) isopropoxide (0.01 mL, 0.04 mmol) was added to a solution of dimethyl malonate (5.0 g, 37.8 mmol) and 1,7-heptanediol (5.0 g, 37.8 mmol) in THF (10 mL) in an argon atmosphere, and the mixture was stirred at 120° C. for 2 hours. While maintaining the same temperature, the reaction flask was exposed to high vacuum intermittently for 5 hours to remove emerging methanol from the reaction mixture. Again, at the same temperature, the partially polymerized mixture in the reaction flask was exposed to constant high vacuum for 24 hours. The viscous polymerized mixture was then dissolved in dichloromethane and was added dropwise into a large volume (100 mL) of stirred methanol to obtain poly (1,7-heptylmalonate) (yield 4.0 g, 55%). The following NMR characterization was obtained for the poly (1,7-heptylmalonate) product: δ 4.10 (t, 4H), 3.36 (s, 2H), 1.50-1.7 (m, 4H), 1.45-1.35 (m, 6H).

Poly [hexyl(2-cyanoethyl) malonate]

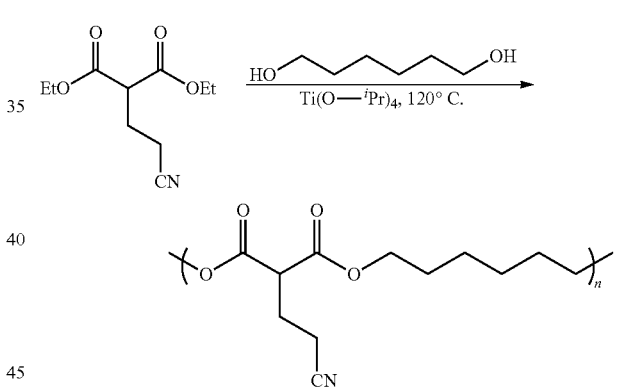

In an exemplary embodiment, poly [hexyl(2-cyanoethyl) malonate] was synthesized as follows. A solution of titanium (IV) isopropoxide (0.07 mL, 0.23 mmol) was added to a solution of diethyl 2-cyanoethyl malonate (5.0 g, 23.4 mmol) and 1,6-hexane diol (2.8 g, 23.4 mmol) in THF (10 mL) in an argon atmosphere, and the mixture was stirred at 120° C. for 2 hours. While maintaining the same temperature, the reaction flask was exposed to high vacuum intermittently for 5 hours to remove emerging ethanol from the reaction mixture. Again, at the same temperature, the partially polymerized mixture in the reaction flask was exposed to constant high vacuum for 24 hours. The viscous polymerized mixture was then dissolved in dichloromethane and was added dropwise into a large volume of stirred methanol (100 mL) to obtain poly [hexyl(2-cyanoethyl) malonate] (yield 5.2 g, 93%). The following NMR characterization was obtained for the poly [hexyl(2-cyanoethyl) malonate] product: δ 4.11 (t, 4H), 3.47 (t, 1H), 2.46 (t, 2H), 2.17 (q, 2H), 1.70-1.55 (bm, 4H), 1.40-1.30 (bs, 4H).

Poly [pentyl(2-cyanoethyl)malonate]

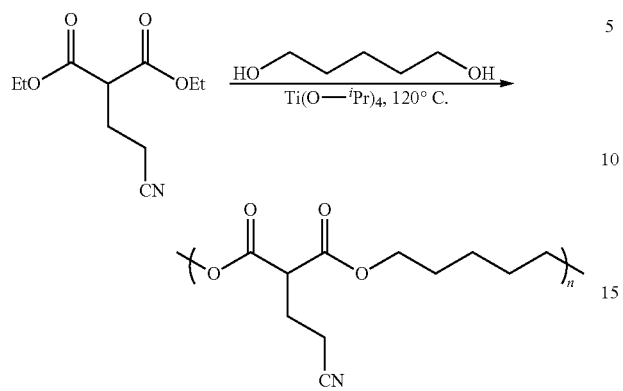

In an exemplary embodiment, poly [pentyl(2-cyanoethyl) malonate] was synthesized as follows. A solution of titanium (IV) isopropoxide (0.07 mL, 0.23 mmol) was added to a solution of diethyl 2-cyanoethyl malonate (5.0 g, 23.4 mmol) and 1,5-pentane diol (2.4 g, 23.4 mmol) in THF (10 mL) in an argon atmosphere, and the mixture was stirred at 120° C. for 2 hours. While maintaining the same temperature, the reaction flask was exposed to high vacuum intermittently for 5 hours to remove emerging ethanol from the reaction mixture. Again, at the same temperature, the partially polymerized mixture in the reaction flask was exposed to constant high vacuum for 24 hours. The viscous polymerized mixture was then dissolved in dichloromethane and dropwise added into a large volume (100 mL) of stirred methanol to poly [pentyl(2-cyanoethyl)malonate] (yield 4.5 g, 85%). The following NMR characterization was obtained for the poly [pentyl(2-cyanoethyl)malonate] product: δ 4.14 (t, 4H), 3.51 (t, 1H), 2.45 (t, 2H), 2.2 (q, 2H), 1.72-1.62 (bm, 4H), 1.45-1.35 (bm, 2H).

Poly [hexyl bis-(2-cyanoethyl)malonate]

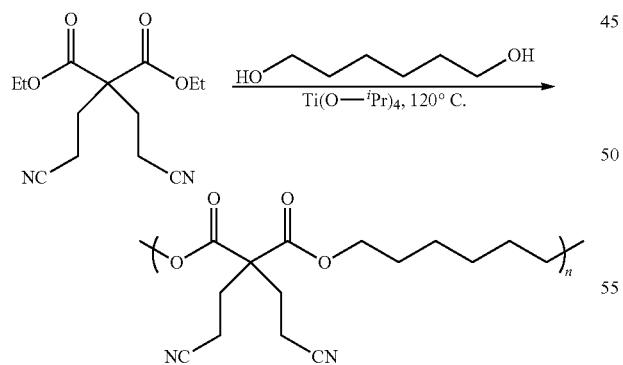

In an exemplary embodiment, poly [hexyl bis-(2-cyanoethyl) malonate] was synthesized as follows. A solution of titanium(IV) isopropoxide (0.06 mL, 0.18 mmol) was added to a solution of diethyl bis (2-cyanoethyl) malonate (5.0 g, 18.8 mmol) and 1,6-hexane diol (2.2 g, 18.8 mmol) in THF (10 mL) in an argon atmosphere, and the mixture was stirred at 120° C. for 2 hours. While maintaining the same temperature, the reaction flask was exposed to high vacuum intermittently for 5 hours to remove emerging ethanol from the reaction mixture. Again, at the same temperature, the partially polymerized mixture in the reaction flask was exposed to constant high vacuum for 24 hours. The viscous polymerized mixture was then dissolved in dichloromethane and added dropwise into a large volume of stirred methanol (100 mL) to obtain poly[hexyl bis-(2-cyanoethyl)malonate] (yield 5.4 g, 98%). The following NMR characterization was obtained for the poly [hexyl bis-(2-cyanoethyl) malonate] product: δ 4.14 (t, 4H), 2.44 (t, 4H), 2.22 (t, 4H), 1.70-1.60 (bm, 4H), 1.45-1.25 (bs, 4H).

Poly [pentyl bis-(2-cyanoethyl)malonate]

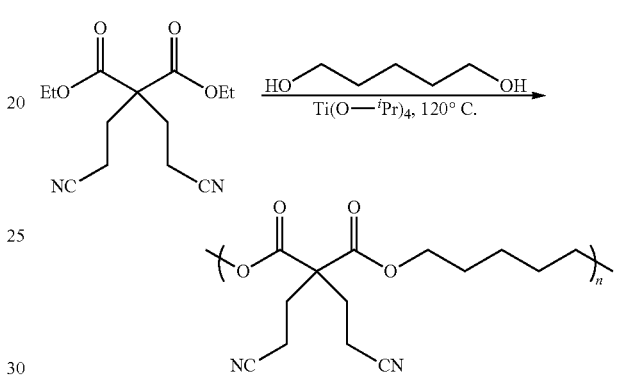

In another exemplary embodiment, poly [pentyl bis-(2-cyanoethyl) malonate] was synthesized as follows. Titanium (IV) isopropoxide (0.06 mL, 0.18 mmol) was added to a solution of diethyl bis-(2-cyanoethyl) malonate (5.0 g, 18.8 mmol) and 1,6-hexane diol (1.95 g, 18.8 mmol) in THF (10 mL) in an argon atmosphere, and the mixture was stirred at 120° C. for 2 hours. While maintaining the same temperature, the reaction flask was exposed to high vacuum intermittently for 5 hours to remove emerging ethanol from the reaction mixture. Again, at the same temperature, the partially polymerized mixture in the reaction flask was exposed to constant high vacuum for 24 hours. The viscous polymerized mixture was then dissolved in dichloromethane and added dropwise into a stirred large volume of methanol (100 mL) to obtain poly [pentyl bis-(2-cyanoethyl) malonate] (yield 5.0 g, 96%). The following NMR characterization was obtained for the poly [pentyl bis-(2-cyanoethyl) malonate] product: δ 4.15 (t, 4H), 2.42 (t, 4H), 2.22 (t, 4H), 1.70-1.60 (bm, 4H), 1.45-1.25 (bs, 2H).

Poly (1,5-pentyloxalate)

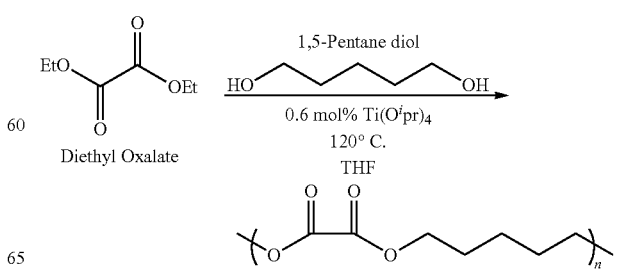

In an exemplary embodiment, poly (1,5-pentyloxalate) was synthesized as follows. Titanium(IV) isopropoxide (0.07 mL, 0.34 mmol) was added to a solution of diethyl oxalate (5.0 g, 34.2 mmol) and 1,5-pentane diol (3.6 g, 34.2 mmol) in THF (10 mL) in an argon atmosphere, and the mixture was stirred at 120° C. for 24 hours. While maintaining the same temperature, the reaction flask was exposed to high vacuum intermittently for 8 hours to remove emerging ethanol from the reaction mixture. Again, at the same temperature, the partially polymerized mixture in the reaction flask was exposed to constant high vacuum for 24 hours. The viscous polymerized mixture was then dissolved in acetonitrile and dropwise added into a large volume (100 mL) of stirred methanol to obtain poly (1,5-pentyloxalate) (yield 2.5 g, 85%). The following NMR characterization was obtained for the poly (1,5-pentyloxalate) product: δ 4.25 (t, 4H), 1.74 (q, 4H), 1.51-1.41 (m, 2H).

Poly (1,7-heptyl oxalate)

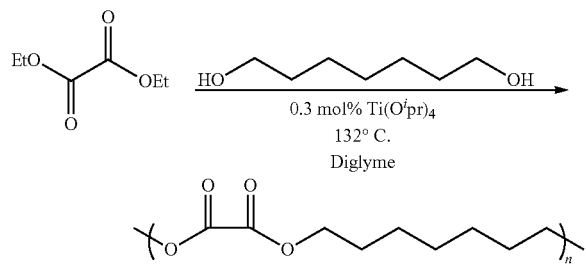

In an exemplary embodiment, poly (1,7-heptyl oxalate) was synthesized as follows. Titanium(IV) isopropoxide (0.07 mL, 0.23 mmol) was added to a solution of diethyl oxalate (5.0 g, 23.4 mmol) and 1,7-heptane diol (2.4 g, 23.4 mmol) in THF (10 mL) in an argon atmosphere, and the mixture was stirred at 120° C. for 2 hours. While maintaining the same temperature, the reaction flask was exposed to high vacuum intermittently for 5 hours to remove emerging ethanol from the reaction mixture. Again, at the same temperature, the partially polymerized mixture in the reaction flask was exposed to constant high vacuum for 24 hours. The viscous polymerized mixture was then dissolved in dichloromethane and dropwise added into a large volume (100 mL) of stirred methanol to obtain poly (1,7-heptyl oxalate) (yield 4.5 g, 85%).

Poly (1,5-pentylsuccinate)

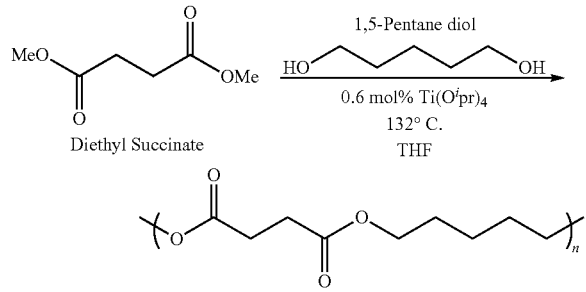

In an exemplary embodiment, poly (1,5-pentylsuccinate) was synthesized as follows. Titanium(IV) isopropoxide (0.07 mL, 0.23 mmol) was added to a solution of dimethyl succinate (5.0 g, 34.2 mmol) and 1,5-pentane diol (3.56 g, 34.2 mmol) in tetrahydrofuran (10 mL) in an argon atmosphere, and the mixture was stirred at 120° C. for 2 hours. While maintaining the same temperature, the reaction flask was exposed to high vacuum intermittently for 5 hours to remove emerging ethanol from the reaction mixture. Again, at the same temperature, the partially polymerized mixture in the reaction flask was exposed to constant high vacuum for 24 hours. The viscous polymerized mixture was then dissolved in dichloromethane and dropwise added into a large volume (100 mL) of stirred methanol to obtain poly (1,5-pentylsuccinate) (yield 2.9 g, 55%).

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself

We claim:

1. A polymer, comprising:
a first diester-based polymer having a structure:

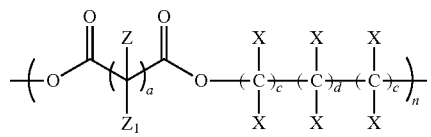

wherein:
each Z and $Z_1$ is selected independently from the group consisting of —F, —$CF_3$, and —$CF_2CF_3$;
each X is selected independently from the group consisting of —F and —$CF_3$;
a is an integer that ranges from 1 to 2;
c and d are each integers that range independently from 1 to 10; and
n is an integer that ranges from 1 to 1000.

2. The polymer of claim 1 further comprising an electrolyte salt, wherein the polymer is an electrolyte.

3. A positive electrode comprising:
a positive electrode active material; and
a catholyte comprising the electrolyte according to claim 2;
wherein the positive electrode active material particles and the catholyte are mixed together.

4. The positive electrode of claim 3 wherein the catholyte further comprises a second polymer selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, polyvinylidene fluoride, and combinations thereof, and wherein the catholyte is a copolymer.

5. The positive electrode of claim 3 wherein the catholyte is crosslinked.

6. The positive electrode of claim 3 wherein the positive electrode active material is selected from the group consisting of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, and combinations thereof.

7. The positive electrode of claim 3 wherein the electrolyte salt is a lithium salt.

8. An electrochemical cell, comprising:
an anode configured to absorb and release lithium ions;
a cathode comprising cathode active material particles, an electronically-conductive additive, and a first catholyte;
a current collector adjacent to an outside surface of the cathode; and
a separator region between the anode and the cathode, the separator region comprising a separator electrolyte configured to facilitate movement of lithium ions back and forth between the anode and the cathode;
wherein the first catholyte comprises the electrolyte according to claim 2, and the electrolyte salt is a lithium salt.

9. The electrochemical cell of claim 8 wherein the first catholyte further comprises a second polymer selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, polyvinylidene fluoride, and combinations thereof, and wherein the first catholyte is a copolymer.

10. The electrochemical cell of claim 8 wherein the first catholyte and the separator electrolyte are the same.

11. The electrochemical cell of claim 8 wherein the separator electrolyte comprises a solid polymer electrolyte.

12. The electrochemical cell of claim 8 further comprising an overlayer between the cathode and the separator region, the overlayer comprising a second catholyte, the second catholyte comprising the electrolyte according to claim 2.

13. The electrochemical cell of claim 12 wherein the first catholyte and the second catholyte are the same.

14. The electrochemical cell of claim 8 wherein the anode comprises a material selected from the group consisting of lithium metal, lithium alloy, lithium titanate, graphite and silicon.

15. The electrochemical cell of claim 8 wherein the first catholyte is crosslinked.

16. The polymer of claim 1 wherein the polymer is crosslinked.

17. The polymer of claim 16 further comprising an electrolyte salt, wherein the polymer is an electrolyte.

18. The polymer of claim 1, further comprising:
a second polymer selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, polyvinylidene fluoride, and combinations thereof;
wherein the first polymer and the second polymer form a copolymer.

19. The polymer of claim 18 further comprising an electrolyte salt, wherein the copolymer is an electrolyte.

20. The polymer of claim 18 wherein the copolymer is crosslinked.

21. The polymer of claim 18 wherein the copolymer is a block copolymer comprising a first block comprising the first polymer and a second block comprising the second polymer.

22. The polymer of claim 21 further comprising an electrolyte salt, wherein the copolymer is an electrolyte.

* * * * *